(12) United States Patent
Kim et al.

(10) Patent No.: US 7,826,057 B2
(45) Date of Patent: Nov. 2, 2010

(54) ELECTRO-OPTIC MODULATOR ASSEMBLY FOR CONTACTLESS TEST OF FLAT PANEL DISPLAY, METHOD FOR CONTACTLESS TEST OF FLAT PANEL DISPLAY USING THE SAME, METHOD FOR MANUFACTURING FLAT PANEL DISPLAY USING THE METHOD FOR CONTACTLESS TEST OF FLAT PANEL DISPLAY, AND RELATED TECHNOLOGIES

(75) Inventors: Sung Hoon Kim, Seoul (KR); Dae Hwa Jeong, Seoul (KR); Bong Gyu Rho, Seoul (KR)

(73) Assignee: LG Electronics Inc., Seoul (KR)

( * ) Notice: Subject to any disclaimer, the term of this patent is extended or adjusted under 35 U.S.C. 154(b) by 368 days.

(21) Appl. No.: 11/944,173

(22) Filed: Nov. 21, 2007

(65) Prior Publication Data

US 2008/0116928 A1 May 22, 2008

(30) Foreign Application Priority Data

Nov. 21, 2006 (KR) ............... 10-2006-0114890
Nov. 21, 2006 (KR) ............... 10-2006-0114893

(51) Int. Cl.
*G01N 21/00* (2006.01)
*G01N 21/55* (2006.01)

(52) U.S. Cl. ............... 356/432; 356/445

(58) Field of Classification Search ... 356/237.1–241.6, 356/426–431, 600–640
See application file for complete search history.

(56) References Cited

U.S. PATENT DOCUMENTS

| | | | | | |
|---|---|---|---|---|---|
| 4,194,113 | A | * | 3/1980 | Fulks et al. | 714/732 |
| 4,943,732 | A | * | 7/1990 | Economou | 250/559.46 |
| 5,212,374 | A | * | 5/1993 | Speedy et al. | 250/201.1 |
| 5,235,272 | A | * | 8/1993 | Henley | 324/770 |
| 5,465,052 | A | * | 11/1995 | Henley | 324/770 |
| 5,691,764 | A | * | 11/1997 | Takekoshi et al. | 348/86 |
| 5,726,749 | A | * | 3/1998 | Schave | 356/239.1 |
| 5,734,158 | A | * | 3/1998 | Nagashima et al. | 250/225 |
| 5,793,221 | A | * | 8/1998 | Aoki | 324/770 |
| 6,836,326 | B2 | * | 12/2004 | Hajduk et al. | 506/12 |
| 6,906,840 | B1 | * | 6/2005 | Fujimori et al. | 359/237 |

* cited by examiner

*Primary Examiner*—Gregory J Toatley, Jr.
*Assistant Examiner*—Jarreas C Underwood
(74) *Attorney, Agent, or Firm*—Fish & Richardson P.C.

(57) ABSTRACT

Disclosed is an electro-optic modulator assembly capable of determining whether each process is being carried out normally during a fabricating process of a flat panel display by performing a contactless testing across the flat panel display, an apparatus and a method for contactless test of flat panel display using the electro-optic modulator assembly, and a method for manufacturing a flat panel display using the method for contactless test of the flat panel display.

20 Claims, 5 Drawing Sheets

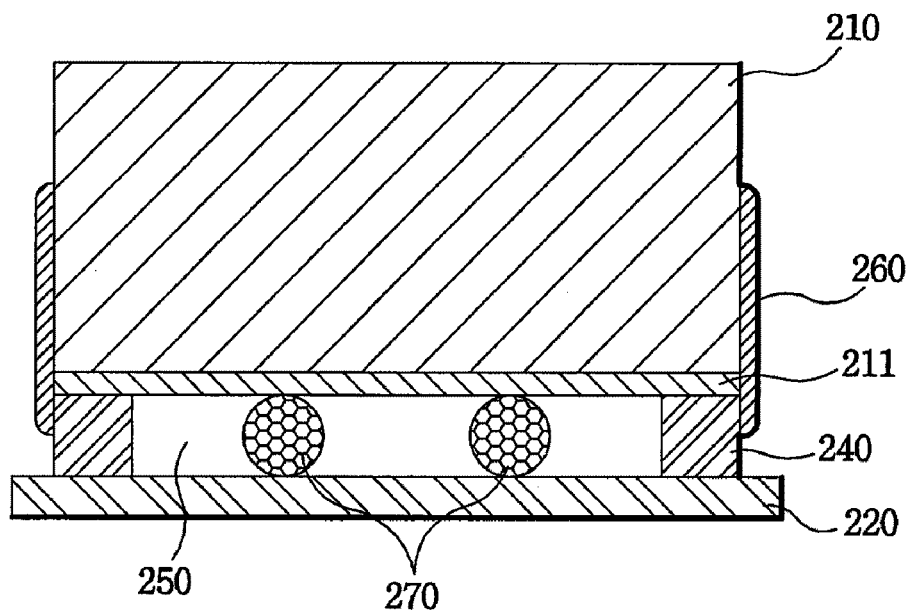
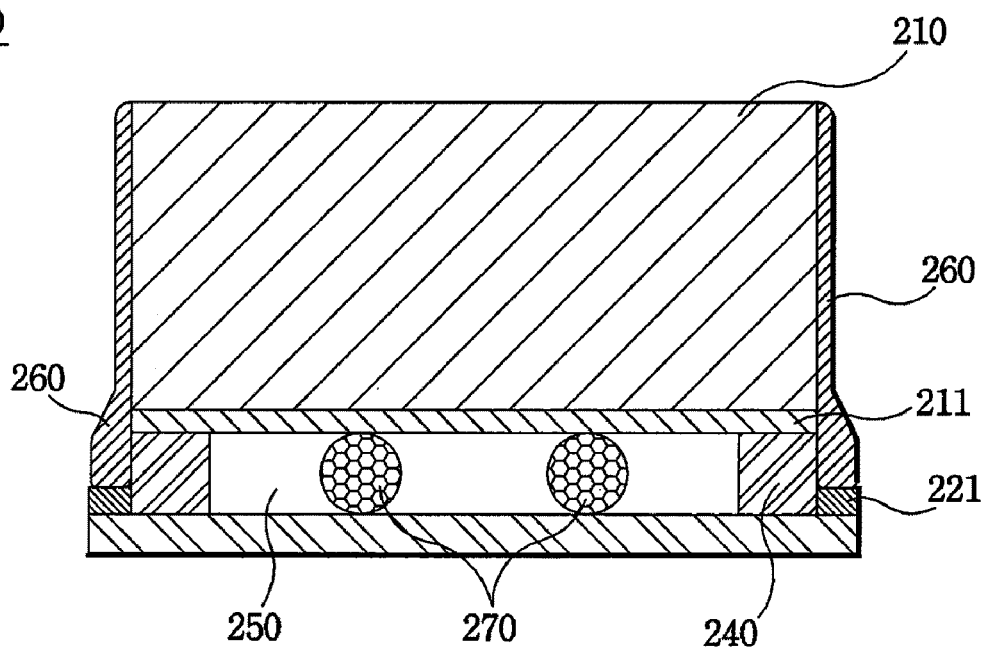
FIG. 4

ELECTRO-OPTIC MODULATOR ASSEMBLY FOR CONTACTLESS TEST OF FLAT PANEL DISPLAY, METHOD FOR CONTACTLESS TEST OF FLAT PANEL DISPLAY USING THE SAME, METHOD FOR MANUFACTURING FLAT PANEL DISPLAY USING THE METHOD FOR CONTACTLESS TEST OF FLAT PANEL DISPLAY, AND RELATED TECHNOLOGIES

CROSS-REFERENCE TO RELATED APPLICATION

The present application is based on, and claims priority from, Korean Application No. 10-2006-0114890 and 10-2006-0114893, each filed Nov. 21, 2006, the disclosure of which is incorporated by reference herein in its entirety.

BACKGROUND

The following description relates generally to a flat panel display using an electro-optic modulator assembly, and at least one implementation relates to an electro-optic modulator (EOM) assembly capable of performing a contactless testing across the flat panel display by electro-optically obtaining a voltage distribution on the flat panel display, an apparatus and a method for contactless test of flat panel display using the same and a method for manufacturing flat panel display using the method for contactless test of the flat panel display.

Recently, flat panel displays such as LCDs (Liquid Crystal Displays), PDPs (Plasma Display Panels) and OLEDs (Organic Light Emitting Diodes), among several other display types, are widely used for displaying images.

The flat panel displays have been gradually designed to increase the display resolution to meet ceaseless requirements of brighter images. In a flat panel display, e.g., a Thin Film Transistor LCD (TFT LCD), one pixel has a width in the 0.1 mm range and one pixel is composed of 3 sub-pixels of Red (R), Green (G) and Blue (B) colors in order to perform color display, that is, each of the unit pixel parts includes a red ("R") pixel, a green ("G") pixel, and a blue ("B") pixel. Resolution relates to a number of pixels used to express an image. Resolution may be used as a scale to represent precision in displaying the image. To improve resolution, display devices may use a physical method of increasing the number of pixels. In active matrix system, a TFT LCD panel thus comprises a matrix of pixels, thousands or millions of which together create an image on the display, and corresponding TFTs acting as switches individually to turn each pixel on or off, where, in other words, the TFT LCD is generally used as a switching device. For example, a TFT LCD needs 1.92 million pixels to create a 1,600×1,200 resolution, which means that the TFT LCD needs 5.76 million sub-pixels. Enhanced resolution rapidly increases the number of pixels that is needed, and as a result thereof, a fabricating process of flat panel displays requires a further sophisticated accuracy.

The enhanced accuracy that is required in the fabricating process naturally entails an increase in the likelihood of creating rejects, and as a result, requirements for testing whether each pixel has been adequately formed are also heightened. To reduce the occurrence of rejects, technical expertise with regard to an apparatus and a method for testing partially processed products (products in the course of being fabricated for flat panel displays) has been also developed.

A TFT LCD pixel structure is formed with a TFT directly deposited on a glass substrate and a transparent conductive material such as ITO (Indium Tin Oxide), where the mechanical strength thereof is relatively low, such that when the pixel may be damaged when a contact-type testing is performed where a probe pin is directly brought into contact with the pixel to test whether the pixel is normally working. Furthermore, chances are that each pixel includes an insulation layer added on a deposited structure, making it impossible to perform a contact-type testing because the probe pin cannot be contacted. Mechanical accuracy of a probe pin must be enhanced concomitant with a trend of increased pixel density, but there is a limit in processing accuracy of the probe pin, such that development has been conducted of late on apparatus and method for contactless test replaceable of the contact-type test.

The contactless test of semi-products for fabricating the flat panel displays may be obtained by making use of the electro-optic effect. The term of "electro-optic effect" is a phenomenon in which a refractive index of a material is changed by an external electric field. There are two types of electro-optical effect: one is an effect proportional to the electric field and the other is proportional to the square of the electric field. The former is called the Pockels effect: the latter is called the Kerr effect. The Pockels effect is a representative example of the electro-optic effect.

In the TFT LCD, when electricity is applied to pixels including the TFT, voltage is distributed in a predetermined pattern responsive to relative positions of a plurality of pixel electrodes distributed within the pixels. Accordingly, the voltage distribution is measured to test whether the pixels are normally operated in comparison with a normal state of voltage distribution.

A testing apparatus is illustrated in FIG. 1 to measure a voltage distribution by contactless method, wherein the apparatus includes a light source (10), an electro-optic (often termed electro-refractive) modulator (20), a device or subject under test (hereinafter referred to as DUT, where the abbreviation DUT means 'Device Under Test', i.e. a product to be tested.), and a camera (40), all of which are sequentially aligned on the same axial line.

Referring to FIG. 1, light emitted from the light source (10) sequentially passes the electro-optic modulator (20) and the DUT (30), where optical properties of the modulator vary in response to intensity of distribution of electric field formed between the modulator (20) and the DUT (30). The light entering from the modulator (20) is modulated in properties thereof following the pass through the modulator (20), where the modulation is obtained by the camera (40) in the form of images to understand a voltage distribution on the surface of the DUT (30).

Now, referring to FIG. 2, the electro-optic modulator (20) includes a modulation layer (21) and a conductive layer (22). The modulation layer (21) is a solid crystal having an electro-optic effect. The conductive layer (21) is mounted to provide a reference voltage surface so that an electric field can be formed relative to the voltage distribution on the surface of the DUT.

The electro-optic modulator is designed to modulate the optical characteristic of light in proportion to the intensity of electric field. The electro-optic modulator is aligned nearest to the DUT in order to minimize characteristic variances of light caused by infinitely moving objects, i.e., suspended materials and air that exist in spacing between the modulator and the DUT. The alignment of the modulator nearest to the DUT is inevitable in consideration of difficulty in detecting the modulation variances, because the intensity of electric field formed by the same voltage difference weakens as the surface of the DUT is distanced from the reference voltage surface to thereby reduce the characteristic variances of the light.

It is therefore preferable that a distance between the modulator and the DUT be shorter than a distance between voltage sources in order to prevent cross-talk from occurring between an electric field formed between the surface of the DUT and the conductive layer (22) of the modulator and an electric field formed by neighboring voltage sources on the DUT.

Meanwhile, the conductive layer (22) is conventionally formed by deposition of ITO in order to fabricate the electro-optic modulator (20) with light transmissible materials. The conductive layer (22) is very thin, weak in structural strength thereof and has difficulty in configuring terminals for electrical connections with outside.

The modulator (20) must be near the DUT to a maximum during test on the flat panel display, such that a distance between the conductive layer and the surface of the DUT is maintained very short. As a result, there is a constant likelihood of the conductive layer or a connecting terminal connected thereto being physically brought into contact with the surface of the DUT.

If contact between the conductive layer and the DUT occurs from an electrode of a DUT surface, a voltage distribution of the DUT surface may be changed by an external voltage source or a ground source connected to the conductive layer for forming a reference voltage to deteriorate the reliability of test result, and may cause an electrical damage to the DUT in certain cases.

Meanwhile, actual implementations of apparatus for contactless test entail several difficulties. Among these shortcomings, for example, the apparatus must have a structure capable of a relative movement between the modulator and the DUT for implementing a test on an entire surface of the flat panel display with one test apparatus because an area of the modulator is smaller than that of DUT (which is a flat panel display). At this time, it is imperative that the test apparatus has mechanical apparatus, such as, loading means for loading the flat panel display (which is a DUT) to the test apparatus and position correction means for aligning the flat panel display to a precise position, where the modulator and the flat panel display should not create a spatial interference with the means for performing the test.

Furthermore, although a contactless test of the modulator does not involve physical contact with the DUT, there may be many instances where the modulator is directly brought into contact with the DUT to cause damage to the DUT as the modulator is actually positioned in close proximity to the DUT. It is therefore important that such problem as the above-mentioned be prevented.

Still furthermore, it may be useful to test whether relevant process at each fabricating process is being precisely progressed in the manufacturing process of flat panel displays, and because the test on the DUT is involved with the aforementioned problems, there is a high likelihood of the entire manufacturing process of the flat panel displays being affected to thereby decrease the manufacturing efficiency.

The present disclosure is directed to substantially obviate one or more of the above and other problems and it is an object of the instant disclosure to provide an electro-optic modulator assembly for contactless test of flat panel display whereby the likelihood of a conductive layer or a connecting terminal being physically brought into contact with a DUT can be minimized.

Another object is to provide an electro-optic modulator assembly for contactless test of flat panel display wherein a structure is improved to facilitate formation of connecting terminal with outside.

Still another object is to provide an apparatus for contactless test of flat panel display wherein there occurs no spatial interference between each constituent element necessary for conducting contactless test of flat panel display and each constituent element for loading and position-correcting a DUT.

Still another object is to provide an apparatus for contactless test of flat panel display wherein test on an entire area of partially processed products for manufacturing flat panel display of wide area can be smoothly performed.

Still further object is to provide a method for contactless test of partially processed products for manufacturing flat panel display.

Still further object is to provide a method for manufacturing flat panel display using the method for contactless test of flat panel display whereby the flat panel display can be efficiently manufactured by performing a contactless test of partially processed products in the manufacturing process of the flat panel display.

Other objects, novel features and distinct advantageous points of the present disclosure will become more apparent by description in detailed implementations thereof with reference to the accompanying drawings.

SUMMARY

In one general aspect, an electro-optic modulator assembly for contactless test of flat panel display comprises: an upper glass plate; a conductive layer coated on an entire bottom surface of the upper glass plate; a lower glass plate discretely arranged toward the lower direction relative to the upper glass plate and having an area larger than that of the upper glass plate; a sealing material for separating a void formed between the upper glass plate and the lower glass plate from outside, an external wall surface thereof being aligned on the same line with a lateral wall of the upper glass plate; a modulation layer made of electro-optic material and filled in the void formed by the upper glass plate, the lower glass plate and the sealing material; and a conductive material extensively continuously coated from the lateral surface of the upper glass plate to a lateral surface of the sealing material.

Implementations of this aspect may include one or more of the following features.

Because the lower glass plate has an area larger than that of the upper glass plate, a margin of the lower glass plate protrudes over the upper glass plate to thereby prevent a surface of a device under test (DUT) arranged underneath the lower glass plate from being electrically brought into contact with the conductive material.

Preferably, the sealing material is made of conductive material and arranged along a peripheral bottom surface of the upper glass plate.

The conductive material may be stably brought into contact with the thin conductive layer because the sealing material abutting against the conductive layer is made of conductive material.

The lower glass plate may further include a sub-conductive layer coated along an upper peripheral surface thereof, and the conductive material is coated extensively to the sub-conductive layer of the lower glass plate.

The conductive material being in contact with the sub-conductive layer, there is a high likelihood of obtaining a stable cohesion compared with coating only on the upper glass plate and the sealing material, and of obtaining a wider conductive surface to facilitate an electrical connection with outside.

Preferably, the sealing material is made of conductive material and the sub-conductive layer of the lower glass plate is brought into contact with the sealing material.

The conductive layer, the sealing material and the sub-conductive layer being electrically connected, the connection from the conductive material to the conductive layer may be stably maintained to simultaneously enhance the cohesion of the conductive material.

The electro-optic modulator assembly for contactless test of flat panel display according to the present inventive concept may further include a spacer inserted for maintaining a space between the upper glass plate and the lower glass plate.

Preferably, the modulation layer is made of liquid crystal material.

In another general aspect, an apparatus for contactless test of flat panel display using an electro-optic modulator assembly comprises: a light source discretely arranged from one surface of a device under test (DUT, i.e., partially processed product) for manufacturing a flat panel display, and irradiating light for passing through the DUT; a modulator discretely arranged from the other surface of the DUT on a light path of the light irradiated from the light source and modulating an optical characteristic of the light in proportion to a voltage distribution on a DUT surface; and a modulation detector for detecting the modulated optical characteristic of the light that has passed the modulator.

Implementations of this aspect may include one or more of the following features.

Preferably, the apparatus further includes an optical lens group for dissipating or concentrating the light irradiated from the light source to the DUT.

The modulator comprises: an upper glass plate; a conductive layer coated on an entire bottom surface of the upper glass plate; a lower glass plate discretely arranged toward the lower direction relative to the upper glass plate and having an area larger than that of the upper glass plate; a sealing material for separating a gap formed between the upper glass plate and the lower glass plate from outside, an external wall surface thereof being aligned on the same line with a lateral wall of the upper glass plate; a modulation layer made of electro-optic material and filled in the gap formed by the upper glass plate, the lower glass plate and the sealing material; and a conductive material extensively continuously coated from the lateral surface of the upper glass plate to a lateral surface of the sealing material.

Preferably, the sealing material is made of conductive material and arranged along a peripheral bottom surface of the upper glass plate, and the lower glass plate further includes a sub-conductive layer coated along an upper peripheral surface thereof, and the conductive material is coated extensively to the sub-conductive layer of the lower glass plate.

Preferably, the sealing material is made of conductive material and the sub-conductive layer of the lower glass plate is brought into contact with the sealing material.

The modulator may further include a spacer for maintaining a space between the upper glass plate and the lower glass plate. The modulation layer of the modulator is made of liquid crystal material.

The modulation detector includes a first polarization filter arranged in front of the modulator on the light path, a second polarization filter arranged in rear of the modulator, and a camera arranged in rear of the second polarization filter.

The modulation detector may further include a phase retarder arranged right in front of the second polarization filter.

Preferably, the apparatus for contactless test of flat panel display using an electro-optic modulator assembly may further include a sub-optical lens group arranged between the camera and the second polarization filter for dissipating or concentrating the light incident on the camera.

Furthermore, an apparatus for contactless test of flat panel display using an electro-optic modulator assembly comprises: a test rack on which a device under test (DUT, i.e., partially processed product) is horizontally laid for manufacturing the flat panel display; a light source disposed underneath the test rack for irradiating light to pass through the DUT; a lower polarization filter disposed on an upper side of the light source of the test rack for polarizing the light from the light source; a modulator discretely disposed upward of the DUT on an axial line of the light irradiated from the light source and changed of ellipticity in proportion to a voltage distribution of a DUT surface; an upper polarization filter disposed on the modulator and polarizing the light that has passed through the modulator; and a camera for obtaining a plan image in response to the light that has passed the upper polarization filter.

Preferably, the apparatus further includes a housing inside which the modulator, the upper polarization filter and the camera are housed, and the housing, the light source and the lower polarization filter are operated horizontally relative to the test rack by maintaining a relative alignment on the same optical axis.

Furthermore, the apparatus may further include an optical lens group for dissipating and concentrating the light irradiated from the light source to the DUT. The apparatus may further include a sub-optical lens group interposed between the upper polarization filter and the camera for dissipating or concentrating the light incident on the camera.

The modulator comprises: an upper glass plate; a conductive layer coated on an entire bottom surface of the upper glass plate; a lower glass plate discretely arranged toward the lower direction relative to the upper glass plate and having an area larger than that of the upper glass plate; a sealing material for separating a gap formed between the upper glass plate and the lower glass plate from outside, an external wall surface thereof being aligned on the same line with a lateral wall of the upper glass plate; a modulation layer made of electro-optic material and filled in the gap formed by the upper glass plate, the lower glass plate and the sealing material; and a conductive material extensively continuously coated from the lateral surface of the upper glass plate to a lateral surface of the sealing material.

Preferably, the sealing material is made of conductive material and arranged along a peripheral bottom surface of the upper glass plate, and the lower glass plate further includes a sub-conductive layer coated along an upper peripheral surface thereof, and the conductive material is coated extensively to the sub-conductive layer of the lower glass plate.

Preferably, the sealing material is made of conductive material and the sub-conductive layer of the lower glass plate is brought into contact with the sealing material.

The modulator may further include a spacer for maintaining a space between the upper glass plate and the lower glass plate. The modulation layer of the modulator is preferably made of liquid crystal material.

In another general aspect, a method for contactless test of flat panel display using an electro-optic modulator assembly comprises: horizontally placing on a test rack a device under test (DUT, i.e., partially processed product) for manufacturing a flat panel display; applying an operating voltage to the DUT; facing a conductive layer-less side of a modulator toward the DUT and arranging the modulator upward of the DUT, where the modulator is formed at one side thereof with a conductive layer and made of electro-optic material; applying a reference voltage to the conductive layer of the modulator; irradiating light from under the DUT; and measuring modulated optical characteristic of light that has passed through the DUT and the modulator.

Implementations of this aspect may include one or more of the following features.

Preferably, the step of measuring the modulated optical characteristic of light comprises; firstly polarizing the light irradiated from under the DUT before entering the modulator; secondly polarizing the light that has passed through the modulator; obtaining, by a camera, a two-dimensional image in response to the secondly polarized light; and image-processing the obtained two-dimensional image to analyze an optical characteristic distribution of the secondly polarized light.

Preferably, a step of horizontally moving the DUT relative to a test rack is further included after the step of obtaining the plan image.

In another general aspect, a method for manufacturing flat panel display using the method for contactless test of flat panel display comprises: forming an electrode on a glass plate for manufacturing a flat panel display; horizontally placing the glass plate on a test rack; applying an operating voltage to the electrode formed on the glass plate; facing a conductive layer-less side of a modulator toward the electrode of the glass plate and arranging the electrode upward of the glass plate, where the modulator is formed at one side thereof with a conductive layer and made of electro-optic material; applying a reference voltage to the conductive layer of the modulator; irradiating light from under the glass plate; and measuring modulated optical characteristic of light that has passed through the glass plate and the modulator; and processing a back-end if the measured optical characteristic is within a prescribed normal scope.

Preferably, the step of measuring the modulated optical characteristic of light comprises: firstly polarizing the light irradiated from under the DUT before entering the modulator; secondly polarizing the light that has passed through the modulator; obtaining, by a camera, a two-dimensional image in response to the secondly polarized light; and image-processing the obtained two-dimensional image to analyze an optical characteristic distribution of the secondly polarized light.

BRIEF DESCRIPTION OF THE DRAWINGS

FIG. 3 is a cross-sectional view of an electro-optic modulator assembly for contactless test of flat panel display according to an exemplary implementation.

FIG. 4 is a cross-sectional view of an electro-optic modulator assembly for contactless test of flat panel display according to another exemplary implementation.

DETAILED DESCRIPTION

Figure 1:
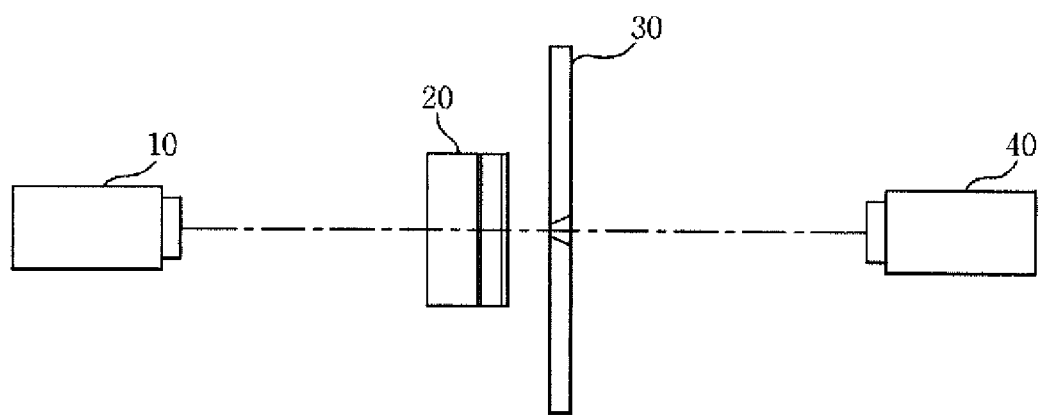
FIG. 1 is a schematic representation of an apparatus for contactless test of flat panel display according to prior art.
Figure 2:
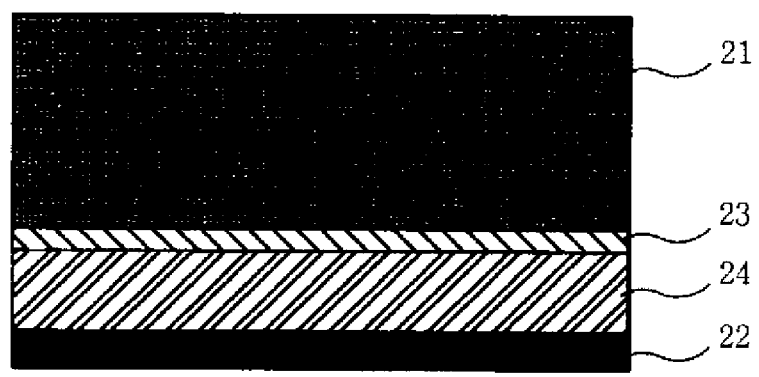
FIG. 2 is a cross-sectional view of an enlarged electro-optic modulator of FIG. 1.

Exemplary implementations of an electro-optic modulator assembly for contactless test of flat panel display will be described in detail with reference to the accompanying drawings.

FIG. 3 is a cross-sectional view of an electro-optic modulator assembly for contactless test of flat panel display according to an exemplary implementation, where the modulator includes an upper glass plate (210), a lower glass plate (220), a conductive layer (211), a sealing material (240), a modulation layer (250) and a conductive material (260). The upper glass plate (210) is made of plate glass material.

The conductive layer (211) is extensively coated underneath the upper glass plate (210). As described later, the conductive layer (211) is designed to provide a reference voltage surface relative to a voltage distribution formed on a DUT surface, and is formed with a conductive material capable of light transmission. It is therefore preferable that the conductive layer (211) is formed with ITO (Indium Tin Oxide). The upper glass plate (210) is directly sputtered thereunder with the ITO to form the conductive layer (211).

The lower glass plate (220) is made of sheet or flat glass material and is discretely arranged underneath the upper glass plate (210) at a predetermined distance. A space between the upper and lower glass plates (210, 220) is an area to be formed with a void for the modulation layer (250. described later) and must obtain as much interval as to accommodate a thickness of the modulation layer (250). Preferably, the lower glass plate (220) is so arranged as to be substantially in parallel relative to the upper glass plate (210). The reason is to maintain an even uniform thickness of the modulation layer (250), thereby allowing the length of optical path to be uniformalized even if light passes through any point of the modulation layer (250). The lower glass plate (220) has a slightly larger area than the upper glass plate (210), such that a cross-sectional periphery of the lower glass plate (220) laterally protrude (drawing-wise) from the periphery of the upper glass plate throughout the circumference thereof. A spacer (270) may be formed between the upper and lower glass plates (210, 220) to maintain a gap therebetween.

The sealing material (240) is arranged between the upper and lower glass plates (210, 220) to form a space, separating from outside by being adhered to respective plates. Preferably, the sealing material (240) is arranged along a marginal bottom surface of the upper glass plate (210). In other words, preferably, an external wall of the sealing material (240) is substantially on the same line with a lateral wall of the upper glass plate (210). This is to facilitate the coating of the conductive material (260. described later), and the laying the external wall of the sealing material (240) on the same straight line with the lateral surface of the upper glass plate (210) makes it possible for an external distal end of the conductive layer (211) to be substantially on the same line.

The void formed by the sealing material (240) is filled with electro-optic material to form the modulation layer (250). The electro-optic material points to a material making use of the electro-optic effect, where the term of "electro-optic effect" is a phenomenon in which a refractive index of a material is changed by an external electric field that is slow in changing relative to frequency of light.

The electro-optic material for forming the modulation layer (250) may be selected from a group consisting of solid crystals such as KDP (Potassium Didydrogen Phosphatic: $KH_2PO_4$), DKDP (Potassium Dideuterium Phosphatic: $KD_2PO_4$), GaAs, BSO (Bismuth Silicon Oxide: $Bi_{12}SiO_{20}$) and BGO (Bismuth Germanium Oxide: $Bi_{12}GeO_{20}$), but liquid crystal is more preferable for the electro-optic material. The crystal modulates ellipticity, i.e., the polarized state of light that passes to a direction formed by electromagnetic field in proportion to the intensity of electromagnetic field within the electromagnetic field. The reason of forming the modulation layer with fluid crystal material is that the modulation layer (250) can be separated from outside by way of the upper and lower glass plates (210, 220) and the sealing material (240), and to broaden the freedom of selection relative to the material of the modulation layer (250). Particularly, the liquid material commonly used for LCD (Liquid Crystal Device) has the advantage of easily obtained.

The conductive layer (260) is extensively coated from a lateral surface of the upper glass plate (210) to an external wall of the sealing material (240). The conductive material (260) may be simply formed by coating, using conductive paste such as silver paste. As mentioned earlier, the arrangement of the external wall of the sealing material (240) on the same straight line with the lateral surface of the upper glass plate (210) facilitates formation of the conductive material (260). Because the conductive paste has plasticity, the conductive material (260) adheres to the conductive layer (211) formed underneath the upper glass plate (210) in the course of the conductive material (260) extensively being coated from the upper glass plate (210) to the sealing material (240), and as a result, the conductive material (260) is electrically connected to the conductive layer (211). Consequently, the conductive material (260) may function as a connecting terminal for electrically connecting the conductive layer (211) with outside.

As illustrated in FIG. 1, the modulator (200) thus constructed approaches the lower glass plate (220) side toward the DUT, and connects an outside voltage source or a ground source to the conductive layer (211). If an operating voltage is applied to a DUT, i.e., TFT LCD (Thin Film Transistor Liquid Crystal Diode), a surface of the DUT is formed with a two-dimensional voltage distribution to correspond with alignment of switching elements and pixel electrodes. An electric field is generated therebetween because of voltage distribution of the DUT surface and voltage difference of the conductive layer (211). The electro-optic material filled in the modulation layer (250) is changed in optical characteristic thereof in proportion to intensity of the electric field, and light that passes the modulation layer (250) is changed in optical characteristic thereof. As a result, the voltage distribution of the DUT surface may be known if light is emitted from outside to pass through the modulation layer (250) and the optical characteristic of the light that has been modulated in the course of passing through the modulation layer (250) is measured.

Under this circumstance, because the lower glass plate (220) has a larger area than that of the upper glass plate (210), the lower glass plate (220) further protrudes toward the lateral direction over the upper glass plate (210) based on the drawing, whereby the conductive material (260) is covered by a margin of the lower glass plate (220) relative to the DUT surface. The conductive material (260) is therefore prevented from directly contacting the DUT surface.

FIG. 4 is a cross-sectional view of an electro-optic modulator assembly for contactless test of flat panel display according to another exemplary implementation. Like reference numerals refer to like elements throughout the drawings in order to omit repeated explanations of the same construction in the following implementations.

The lower glass plate (220) further includes a sub-conductive layer (221). The sub-conductive layer (221) is formed at an upper margin of the lower glass plate (220), and may be formed by evaporation process of ITO just like that of the conductive layer (211) of the upper glass plate (210).

The conductive material (260) is extensively coated on from the lateral surface of the upper glass plate (210) to the sub-conductive layer (221) of the lower glass plate (220) via the external wall of the sealing material (240). The sub-conductive layer (221) formed by evaporation of ITO to the lower glass plate (220) is tightly abutted against the conductive material (260) to reinforce the coupling force of the conductive material (260), and to ease the electrical connection with outside because a wider area can be obtained. The sub-conductive layer (221) is formed on the upper surface of the lower glass plate (220) to thereby prevent the problem of the electrical connection with the DUT to be positioned underneath the lower glass plate (220).

Preferably, the sealing material (240) is made of conductive material. The sealing material (240) is directly brought into contact with the conductive layer (211) formed underneath the upper glass plate (210) to function as an electrode relative to the conductive layer (211) if the sealing material (240) is made of conductive material.

If the conductive material (260) is extensively coated on from the lateral surface of the upper glass plate (210) to the external wall of the sealing material (240), the area contactable with the conductive layer (211) of the upper glass plate (210) is very limited in view of the thickness of the conductive layer (211) if the sealing material (240) is made of non-conductive material, thereby creating a problem of destabilizing the electrical connection between the conductive material (260) and the conductive layer (211).

However, if the sealing material (240) is made of conducting material, the electrical connection between the conductive material (260) and the conductive layer (211) may be more stably maintained. Furthermore, if the sealing material (240) is made of conducting material, the sub-conductive layer (221) of the lower glass plate (220) is preferred to contact the sealing material (240). At this time, the sub-conductive layer (221) is electrically connected to the conductive layer (211) via the sealing material (240). Particularly, if the conductive material (260) is extensively coated on to the sub-conductive layer (221), the electrical connection from the conductive layer (260) to the conductive layer (211) of the upper glass plate (210) may be more stabilized.

It is not essential that both the sealing material (240) is made of conductive material and the upper surface of the lower glass plate (220) is formed with the sub-conductive layer (221). Even though this requirement is independently satisfied, improvement of the operational effect thus explained may be obtained. In other words, even if only the sealing material (240) is made of conductive material and the sub-conductive layer (221) of the lower glass plate (220) is not formed, the conductive material (260) may obtain a much wider contact area relative to the conductive layer (211) via the sealing material (240) to stably maintain an electrical connection with the outside. Furthermore, even if the sealing material (240) is not made of conductive material and only if the lower glass plate (220) is formed with the sub-conductive layer (221), the conductive material (260) is attached to the lower glass plate (220) if the conductive material (260) is extensively coated up to the sub-conductive layer (221), such that a stronger coupling force may be obtained and a a wider conductive surface exposed to the outside may be acquired compared with attachment only to the upper glass plate (210) and the lateral surface of the sealing material (240).

Now, exemplary implementations of apparatus for contactless test of flat panel display using electro-optic modulator assembly according to the present inventive concept will be described with reference to the accompanying drawings.

Figure 5:
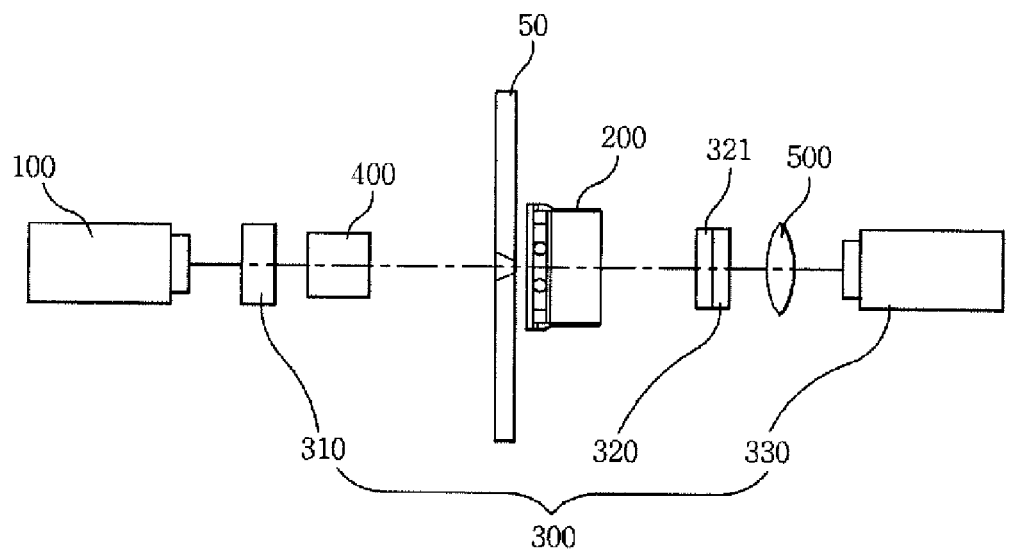
FIG. 5 is a cross-sectional view of an apparatus for contactless test of flat panel display using an electro-optic modulator assembly according to an exemplary implementation.

FIG. 5 is a cross-sectional view of an apparatus for contactless test of flat panel display using an electro-optic modulator assembly according to an exemplary implementation.

Referring to FIG. 5, a light source (100) which is means for generating light irradiates light toward a DUT (50). The light source (100) is a semi-product for fabricating the flat panel displays, and is discretely arranged from one surface of the plate-shaped DUT (50). The light from the light source (100) passes through the DUT (50) via the modulator (200. described later), where the optical characteristics thereof such as phase and polarized state are changed. Therefore, the light may be defined as a test light beam in that the modulated characteristics of the light are detected to determine whether the DUT (50) is operated normally.

Preferably, the test light beam is a laser which has even optical characteristics including the phase. The light source (100) may therefore include a xenon lamp, a sodium lamp or a light emission diode (LED), and more particularly may include a laser oscillator.

An optical lens group (400) is preferably arranged between the light source (100) and the DUT (50) for diffusing and concentrating the test light beam or changing a light path. Light diffusion is needed if a cross-sectional area perpendicular to an advancing direction of the test light beam is smaller than a test area on the DUT (50). Adversely, i.e., if the test area of the DUT (50) is smaller, the concentration of the test light beam is needed. As a result, the optical lens group (400) may be a single convex lens, a single concave lens or a combination of both. The optical lens group (400) may be added with means for changing light paths including a reflector and optical fiber to belie its name.

The modulator (200) is discretely arranged from the other surface of the DUT (50) on the advancing path of the test light beam, i.e., on the light path, and is positioned opposite the light source (100) about the DUT (50). Therefore, the test light beam that has passed the DUT (50) is incident on the modulator (200).

For example, if an electric source is connected to a pixel, a voltage distribution on a pixel surface gets uneven in response to alignment of switching elements or pixel electrodes. In other words, the voltage is distributed on the surface of the DUT (50) in a predetermined two dimensional pattern. If the conductive layer (211) of the modulator (200) is grounded, or if the conductive layer (211) is connected to a discretionary level of voltage source to assume a reference voltage surface, an electromagnetic field is generated by voltage difference between the surface of the DUT (50) and the conductive layer (211). The intensity distribution of the electromagnetic field is in proportion to the voltage distribution of the surface of the DUT (50). The modulation layer (250) of the modulator (200) lies within the electromagnetic field, such that the optical characteristics vary in response to the intensity of the electromagnetic field, where the optical characteristics of the electro-optic material also vary in proportion to the voltage distribution of the surface of the DUT (50). If light is made to pass through the modulator (200), the test light beam that has passed the modulator (200) is modulated in optical characteristics thereof compared with the test light beam before the passing of the modulator (200), where the modulation thereof is also in proportion to the voltage distribution on the surface of the DUT (50). The optical characteristics of the modulation layer (250) thus modulated point to the polarized state, particularly ellipticity. If the modulation of the test light beam is detected by a modulation detector (described later), surface voltage distribution of the DUT (50) may be instantly known, and an analysis result thereof allows testing or determining whether the DUT (50) is working normally.

The shorter the distance is between the modulator (200) and the DUT (50), the better the optical characteristics. The modulator (200) is designed to vary the ellipticity of the test light beam in accordance with the variation of the optical characteristics proportional to the intensity of the electromagnetic field, such that it is essential to arrange the modulator (200) as close as possible to the DUT (50) in order to minimize the variations of optical characteristics of the test light beam caused by unsettled moving objects such as air and floating matters existing between the modulator (200) and the DUT (50).

The reason of arranging the modulator (200) as close as possible to the DUT (50) is to take into account the fact that intensity of electromagnetic field formed by the same voltage difference weakens as the reference voltage surface and the surface of the DUT (50) are distanced to lessen the ellipticity variation of the test light beam, making it difficult to detect a modulated degree. Furthermore, it is preferable that a distance between the modulator (200) and the DUT (50) be maintained at least at a shorter length than a distance between the voltage sources in order to prevent the electromagnetic field formed between the surface of the DUT (50) and the conductive layer (211) of the modulator (200) from being cross-talked with the electromagnetic field formed between the neighboring voltage sources on the DUT (50).

The modulator (200) may be manufactured in various shapes, but it is preferable that the modulator (200) use the electro-optic modulator assembly for contactless test of flat panel display according to the instant disclosure.

A modulation detector (300) is designed to detect the optical characteristics that vary along a cross-sectional area of the test light beam that has passed the modulator (200). The test light beam is changed in optical characteristics, i.e., phase and ellipticity when passing through the modulator (200), where the variation is in proportion to the voltage distribution formed on the surface of the DUT (50), such that the modulation detector (300) may be any type including an optical phase detector as long as optical characteristics of the test light beam can be measured. However, the modulation detector is preferably comprised of a pair of polarization filters (310, 320) and a camera (330).

The pair of polarization filters (310, 320) and the camera (330) comprising the modulation detector (300) must be arranged on a light path of the test light beam. The first polarization filter (310) is arranged between the light source (100) and the DUT (50), the second polarization filter is disposed at a rear of the modulator (200) and the camera (33) is mounted at a rear of the second polarization filter (320).

It is sufficient for the first polarization filter (310) to be arranged on the front side of the modulator (200), but in view of the foregoing, it is more preferable that the first polarization filter (310) be disposed in front of the DUT (50) as the distance between the modulator (200) and the DUT (50). The second polarization filter (320) is sufficient to be disposed between the camera (330) and the modulator (200). In other words, the first polarization filter (310) and the second polarization filter (320) are placed in front of and in rear of the modulator (200).

The test light beam irradiated from the light source (100) is polarized after passing the first polarization filter (310), and the test light beam comes to a partial polarized state after passing the DUT (50) and the modulator (200), i.e., is changed of ellipticity thereof. If the second polarization filter (320) is rotated at a predetermined angle relative to the first polarization filter (310), part of the modulated test light beam cannot pass the second polarization filter (320). When said part of the modulated test light beam is stored in a two dimensional image by the camera (330), a contrast distribution shown on the two dimensional image will become the ellipticity of the test light beam. A phase retarder is preferably disposed right in front of the second polarization filter (320) in order to highlight the contrast ratio. The phase retarder may be a quarter-wave plate. The phase retarder may modulate the optical characteristics of the elliptically polarized test light beam to thereby increase the contrast ratio on the image obtained by the camera (330). The imaged obtained by the camera (330) may be analyzed by the conventional image processing technique to grasp the voltage distribution formed on the DUT surface in the long run. The image processing technique is the well known art such that no further detailed explanation thereto will be given here.

Meanwhile, the aforementioned sub-optical lens group (500) may be additionally disposed in front of the camera in order to dissipate or concentrate the light incident on the camera (330). The sub-optical lens group (500) basically has the same function as that of the optical lens group (400) for dissipating or concentrating test light beam from the light source (100), except that the sub-optical lens group (500) focuses more on obtainment of images by the camera (330). Therefore, the additionally mounted sub-optical lens group (500) may further include a lens adapter and an automatic focusing module for controlling the focus and scale factor.

Figure 6:
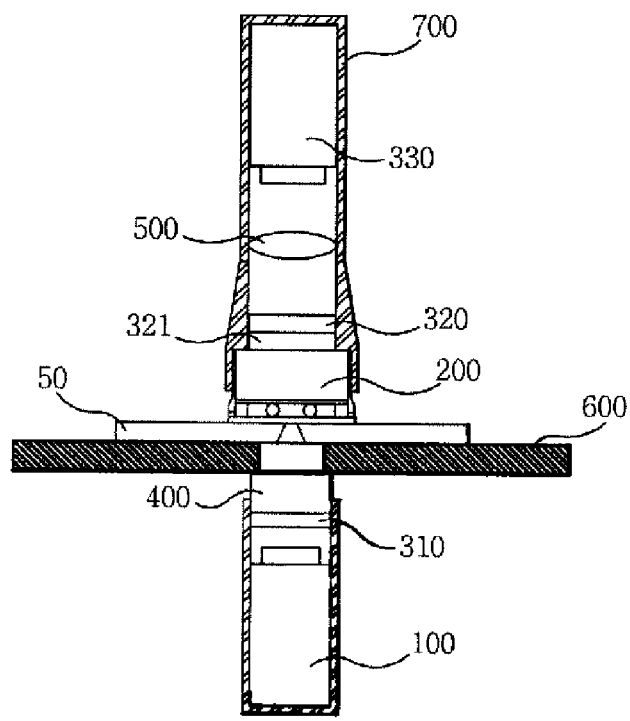
FIG. 6 is a cross-sectional view of an apparatus for contactless test of flat panel display using an electro-optic modulator assembly according to another exemplary implementation.

FIG. 6 is a cross-sectional view of an apparatus for contactless test of flat panel display using an electro-optic modulator assembly according to another exemplary implementation.

Throughout the explanation of the exemplary implementations, like reference numerals should be understood to refer to like elements, features and structures, and redundancy of the same structures as those of the foregoing implementations will be omitted. Descriptions of well-known functions and constructions are omitted for clarity and conciseness, unless otherwise stated.

A test rack (600) supports the DUT (50) in the course of testing, and is horizontally placed thereon with the DUT (50). The test rack (600) is vertically formed with a through hole through which light from the light source (100) can pass. The test rack (600) may include loading means for loading the DUT (50) thereon, and position correction means (not shown) for guiding a correct position of the DUT (50). The loading means and the position correction means are somewhat complicated in mechanical structures thereof and bulky. Hence, most of the operational parts or elements are not exposed onto the test rack but disposed within the test rack or underneath the test rack. The mechanical structures of the loading means and position correction means are widely used in the flat panel display manufacturing process as well as in the semiconductor wafer fabricating process, such that detailed explanation thereto is omitted.

The horizontal support of the DUT (50) by the test rack (600) has something to do with a technical trend of a flat panel display which is being increased in size thereof. In other words, a vertical support of a large-sized flat panel display is susceptible to buckling as main material of flat panel display is glass, and once the flat panel display is buckled, it is impossible to test minuscule elements on the surface of the flat panel display or reliability of test results deteriorates. Another drawback is that there is an increased likelihood of the flat panel display being broken by external vibration if the flat panel display is vertically maintained.

The light source (100) and the first polarization filter (310) are provided underneath the test rack (600). The first polarization filter (310) is disposed lower than the second polarization filter (320. described later), so that the second polarization filter (320) may be called a lower polarization filter.

The modulator (200), the second polarization filter (320) and the camera (330) are sequentially disposed on the test rack. The second polarization filter (320) is disposed higher than the first polarization filter, so that the second polarization filter may be called as the upper polarization filter. Preferably, the modulator (200), the second polarization filter (320) and the camera (330) are accommodated in a single housing (700) to allow said three elements to constitute a single module. If the sub-optical lens group (500) is mounted, the sub-optical lens group (500) may be also mounted within the housing (700).

The modulator (200), the second polarization filter (320) and the camera (330) being mounted in the single housing (700), it is possible for the three elements to horizontally move relative to the DUT (50) laid on the test rack (600) while the three elements maintain the same relative arrangement as long as the housing (700) is horizontally operated.

The reason of horizontally moving the housing (700) is that a test region on the DUT (50) is typically larger than a light transmission region of the modulator (200), as the large-sized flat panel display becomes more commonplace these days, the modulator (200) and other elements related thereto must be horizontally scanned for testing an entire test region on the DUT (50). Preferably, the light source (100) for emitting test light beam to the modulator (200) and the upper polarization filter (320) are also operated horizontally, while maintaining a relative position of being arranged on the same optical axis as that of the housing (700). In other words, the housing (700), the light source (100) and the upper polarization filter (320) maintain a relative position of being laid on the same optical axis, and move horizontally relative to the DUT (50) disposed on the test rack (600), whereby test is being performed on an entire test region on the surface of the DUT (50).

If the sub-optical lens group (500) is mounted, the group (500) may include a plurality of lens for adjusting the optical scale factor of the image to be obtained by the camera (330), or for adjusting focus necessary for obtaining the image, a lens adapter for maintaining and adjusting the plurality of lenses to a predetermined arrangement state and an auto focusing module to enlarge the physical size thereof and to complicate a driving apparatus included in the lens adapter and the auto focusing module.

The sub-optical lens group (500) can be arranged on an upper side of the test rack (600) along with the camera (330), thereby enabling to remarkably reduce the mechanical interference with the loading means and the position correction means, when compared with the arrangement of the sub-optical lens group (500) being placed underneath the test rack (700).

The optical lens group (400) disposed underneath the test rack (600) needs fewer complicated mechanisms than the sub-optical lens group (500) to allow being manufactured in a physically smaller size. As a result, even if the light source (100), the optical lens group (400) and the lower polarization filter (310) are all mounted, there is no worry of the mechanical interference being generated with the loading means and the position correction means.

Now, an exemplary implementation of contactless test method of flat panel display using an electro-optic modulator assembly will be described in detail.

Figure 7:
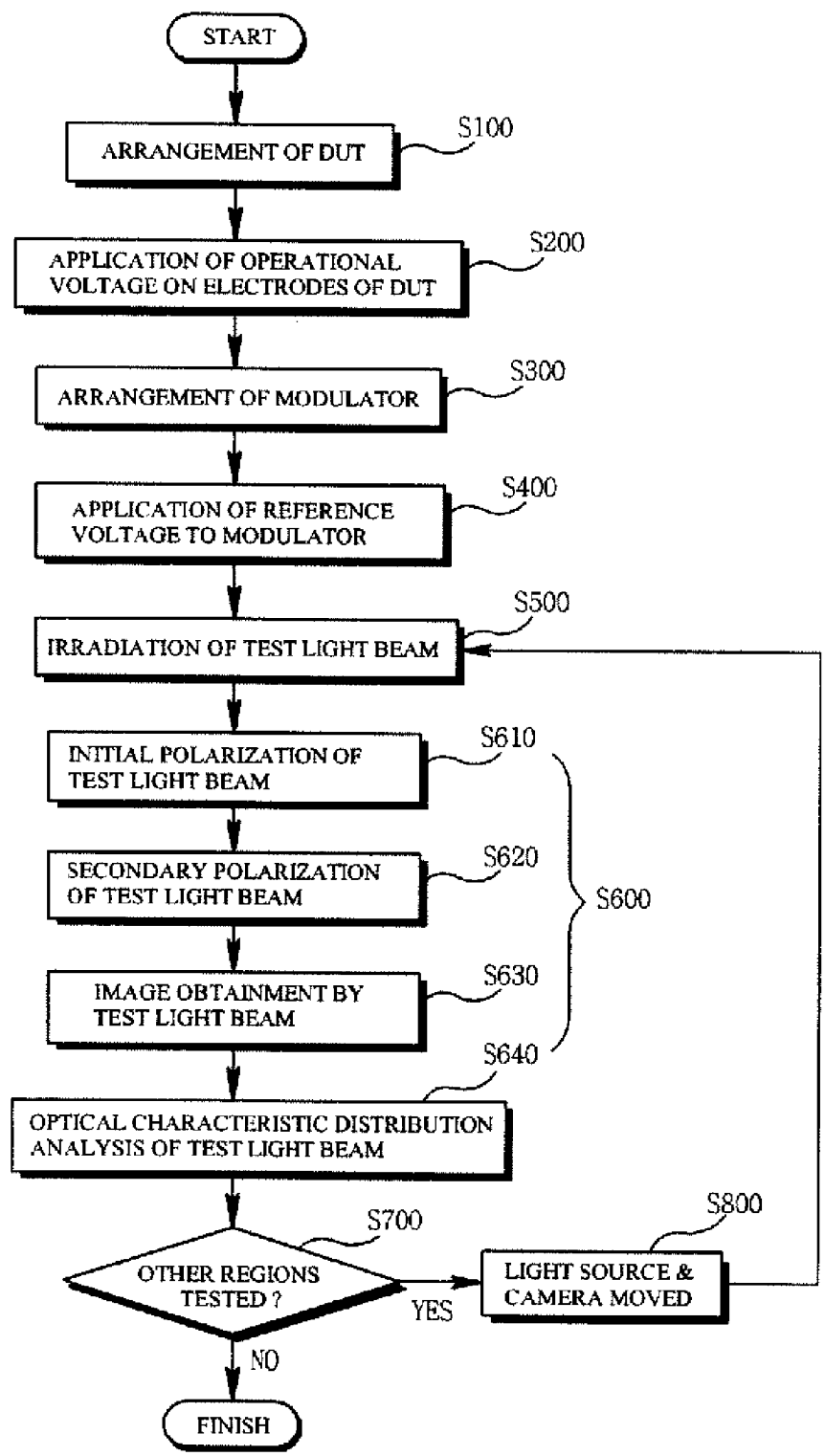
FIG. 7 is a flowchart illustrating a method for contactless test of flat panel display using an electro-optic modulator assembly according to an exemplary implementation.

FIG. 7 is a flowchart illustrating a method for contactless test of flat panel display using an electro-optic modulator assembly according to an exemplary implementation.

First of all, the DUT which is a partially processed product (a product in the course of being fabricated for flat panel display) is horizontally placed on the test rack for performing the test (S100). The reason of placing the DUT on the test rack has been already described. The DUT is applied with an operational voltage by being connected to an external electric power to be placed under the same condition as that of the actual operating state (S200).

Meanwhile, a modulator is placed adjacent to an upper surface of the DUT (S300). The modulator is made of an electro-optic material that changes optical characteristics in response to intensity of the electromagnetic field and is formed at one side thereof with a conductive layer. The modulator is so arranged that a side where the conductive layer is formed is distanced from the DUT.

Under this circumstance, a reference voltage is applied to the conductive layer of the modulator (S400). The reference voltage is to form an electromagnetic field between the conductive layer and the DUT relative to a voltage distribution to be formed on the upper surface of the DUT. Preferably, the conductive layer is grounded for applying the reference voltage, although a discretionary voltage source may be connected thereto.

Successively, light is irradiated upwards from under the DUT (S500). The irradiated light passes the DUT to reach the modulator. The irradiated light sequentially passes the electro-optical material and the conductive layer of the modulator, where the optical characteristics of the electro-optical material is changed in proportion to the intensity of the electromagnetic field formed between the conductive layer and the upper surface of the DUT, and the light passing therethrough is also modulated in optical characteristics. The quality of the DUT can be tested by the light, and therefore, the light may be called the test light beam after all.

The modulated light, i.e., the optical characteristics of the test light beam is measured (S600). The optical characteristics of the modulated test light beam is proportional to the two dimensional distribution of voltage formed on the upper surface of the DUT, such that the voltage distribution on the upper surface of the DUT may be known by measurement of how the modulated test light beam has been two-dimensionally distributed.

In order to facilitate the performance of the process (S600) for measuring the optical characteristics of the modulated test light beam, the step (S600) of measuring the optical characteristics of the modulated test light beam preferably comprises: performing an initial polarization of the test light beam before the test light beam irradiated from under the DUT enters the modulator (S610); performing a secondary polarization of the test light beam that has passed the modulator (S620); and obtaining a two dimensional image of the secondary polarization of the test light beam by a camera (S630). Adjustment of each polarized angle at the two polarization steps (S610, S620) may lead to masking part of the modulated test light beam. As a result, the optical characteristics of the modulated test light beam may be shown as a contrast difference in the image to be obtained by the camera. Through the obtainment (S630) of the optical characteristics of the test light exhibited in the image as the form of contrast difference, an optical characteristic distribution of the test light beam may be grasped by the conventional image processing to thereby enable to know the voltage distribution on the upper surface of the DUT (S640).

Following measuring the optical characteristics of the modulated test light beam (S600), a determination is made as to whether there is any need of testing of other regions on the upper surface of the DUT (S700), and if necessary, the light source of the test light beam and the camera are horizontally moved relative to the DUT (S800). After the movement is completed, and if the step (S500) of irradiating the test light beam onto the DUT again is performed, the test of other regions of the DUT may be conducted in the same fashion as before.

Hereinafter, an exemplary method for contactless test of flat panel display using an electro-optic modulator will be described in detail.

Figure 8:
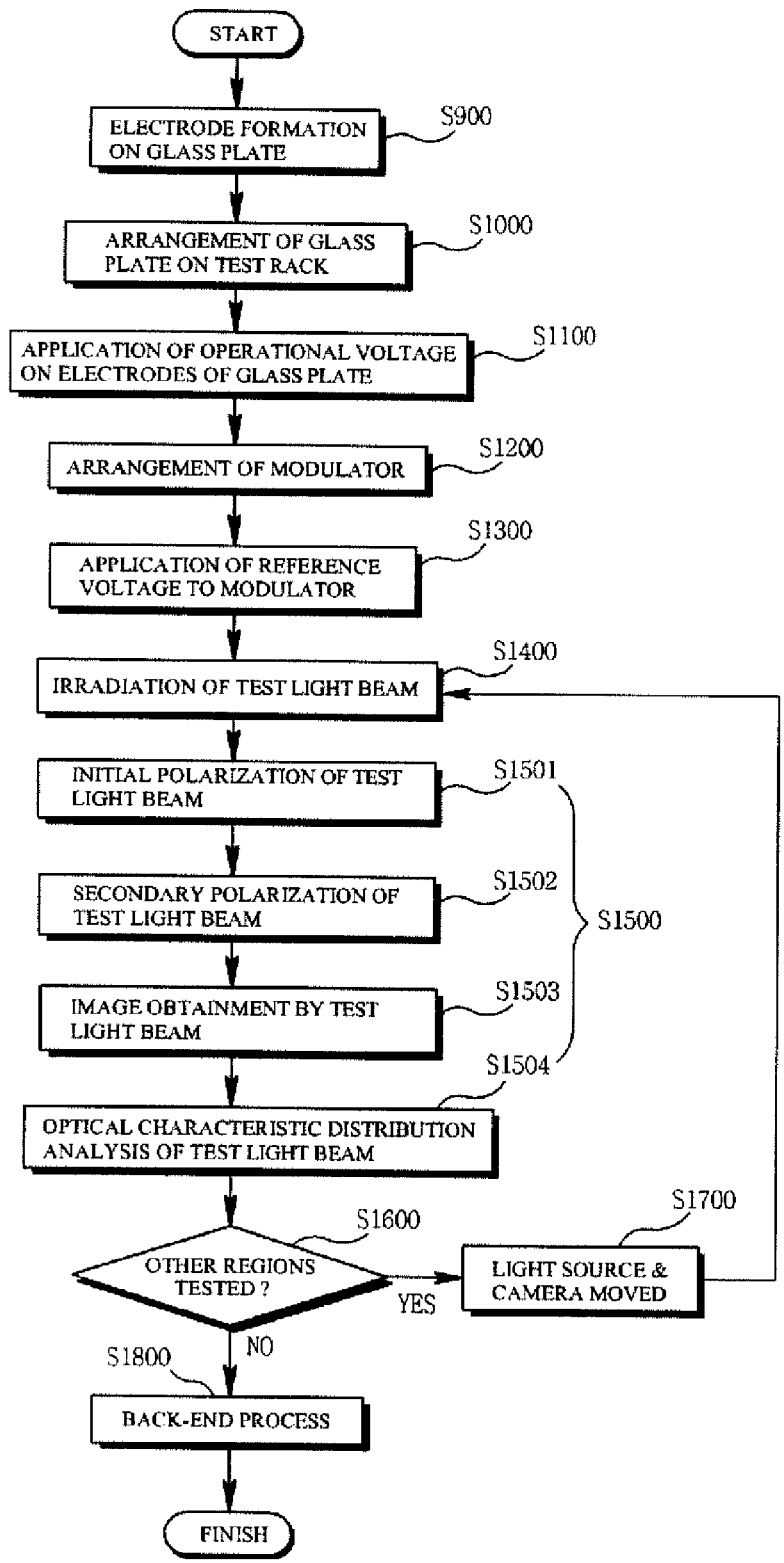
FIG. 8 is a flowchart illustrating a method for manufacturing flat panel display according to an exemplary implementation.

FIG. 8 is a flowchart illustrating a method for manufacturing flat panel display according to an exemplary implementation.

Now, a fabricating process of TFT LCD (Thin Film Transistor Liquid Crystal Display) will be briefly discussed as one of the manufacturing methods of typical flat panel displays, wherein the fabricating process, for example, includes forming an electrode, to be more specific, a TFT on a surface of one glass plate, and forming a color filter on the other glass plate. Next, the flow now proceeds to combining the two glass plates and introducing liquid crystal into the two glass plates known as a liquid crystal cell process. Lastly, a module process for fabricating a polarizer, a back light module and the liquid crystal cell is performed to complete the fabrication of LCD panels.

In another example of manufacturing the flat display panels, a plasma display panel (PDP) fabricating process will be briefly disclosed.

A glass plate is formed with an electrode and a dielectric layer, and the other glass plate is formed with an address electrode, a barrier rib and phosphor layers. The two glass plates are combined into which gas is introduced. Lastly, a driving circuit is attached to complete the fabricating process of PDPs.

As noted from the foregoing, although the LCD fabricating process and the PDP fabricating process may be different in each individual step, both processes commonly include a process of forming electrodes as TFT includes electrodes. Therefore, following the completion of each process of forming the electrodes, a need for test of whether the electrodes formed by relevant processes are working properly occurs for both the LCD fabricating process and the PDP fabricating process.

To this end, an electrode is first formed on a glass plate (S900). The glass plate formed with the electrode is horizontally placed on a test rack (S1000), an operational voltage is applied to the electrode formed on the glass plate (S1100), and a modulator formed with a conductive layer at one side and made of electro-optical material is arranged on an upper side of the glass plate so that a side having no conductive layer faces the electrode of the glass plate (S1200), Light is irradiated from under the glass plate (S1400). The light irradiated from under the glass plate is intended to test whether the electrode formed on the glass plate is operating properly, and may be referred to as test light beam.

Successively, the irradiated light passes the glass plates and the modulator and is modulated of optical characteristics by the electromagnetic field formed between the electrode formed on the glass plates and the conductive layer of the modulator. The modulation of the optical characteristics vary in response to the intensity of the electromagnetic field, such that the intensity of the electromagnetic field may be instantly known if the modulated degree of the optical characteristics is measured.

The modulated optical characteristics of light having passed the glass plates and the modulator are measured (S1500), determination is made as to whether the measured optical characteristics are within a predetermined normal scope, and if the measured optical characteristics are within a predetermined normal scope, a back-end is performed (S1800), where the back-end defines all the processes following the formation of electrodes. The back-end in the LCD fabricating process may define the liquid crystal cell process for combining two glass plates and introducing liquid crystal into the two glass plates, and the module process for fabricating a polarizer, a driving circuit, a back light module and the liquid crystal cell. The back-end in the PDP fabricating process may define a large-unit process of i.e., combining two glass plates, sealing gas thereinto and attaching a driving circuit, or may define a small-unit process of i.e., forming an electrode and forming a protective film on the electrode.

Meanwhile, the step (S1500) of measuring the modulated optical characteristics of light preferably comprises: performing an initial polarization of light before the light irradiated from under the DUT enters the modulator (S1501); performing a secondary polarization of the light that has passed through the modulator (S1502); and obtaining a two dimensional image of the secondary polarization of the light by a camera (S1503); and image-processing the obtained two dimensional image to analyze the optical characteristic distribution of the secondarily polarized light (S1504).

Furthermore, once the test of one region is completed, determination is made as to whether a test for other regions is necessary (S1600), and movement of the light source for irradiating the light and the camera is carried out for testing other regions (S1700).

Following the movement of the light source and the camera, the step (S1400) of irradiating the light and subsequent steps thereof may be sequentially carried out to test whether electrodes of glass plates on other regions are working normally. Once tests on all the regions are finished, the back-end may be processed (S1800).

As the present disclosure may be embodied in several forms without departing from the spirit or essential characteristics thereof, it should also be understood that the above-described implementations are not limited by any of the details of the foregoing description, unless otherwise specified, but rather should be construed broadly within its spirit and scope as defined in the appended claims, and therefore it will be understood by those of ordinary skill in the art that all changes and modifications that fall within the metes and bounds of the claims, or equivalents of such metes and bounds are therefore intended to be embraced by the appended claims.

As apparent from the foregoing, the electro-optic modulator assembly according to the instant disclosure is such that a conductive layer is covered by an upper glass plate to thereby protect the conductive layer against physical contacts with outside. A modulation layer can be isolated from outside by an upper glass plate, a lower glass plate and a sealing material to allow solid crystal as well as liquid crystal to be used as material for the modulation layer.

Furthermore, the conductive material coated from the upper glass plate to the sealing material may be utilized as a connection terminal with the outside, and the conductive material may be easily formed by a method of coating a conductive paste such as silver paste, so that it is easy to form a terminal for connecting the modulator with the outside.

The effect thus explained may be further enhanced when an upper surface of the lower glass plate is formed with a sub-conductive layer, a sealing material is made of conductive material or the sub-conductive layer contacts the sealing material made of conductive material.

Still furthermore, the electro-optic modulator assembly according to the instant disclosure is such that the lower glass plate has an area larger than that of the upper glass plate to allow a periphery of the lower glass plate to protrude relative to the upper glass plate, and the protrusive area of the lower glass plate prevents the conductive material laterally formed on the upper glass plate from being brought into contact with the DUT placed underneath the lower glass plate. Therefore, the problem that might be generated from the modulator being electrically brought into contact with the DUT may be prevented.

The apparatus for contactless test of flat panel display using an electro-optical modulator assembly is arranged in such a manner that a modulator and means for detecting the optical characteristics of test light beam modulated by the modulator are all disposed at one side of the DUT. In other words, a modulation detector configured of complicated structures and moving path and a modulator are arranged at one side of the DUT, and a light source configured of a simple structure is arranged on the other side of the DUT to allow the modulation detector and the modulator to be disposed together at a position where there occurs no spatial interference with loading means of the DUT or position correction means. Furthermore, the modulation detector and the modulator can be modularized in a single housing to help ease a movement relative to the DUT.

The apparatus for contactless test of flat panel display using an electro-optical modulator assembly is configured in such a fashion that the lower glass plate of the modulator is laterally protruded to prevent an external connection terminal of the modulator from being electrically connected to the DUT. A gap in which the modulation layer is to be formed between the upper glass plate, the lower glass plate and sealing material can be isolated from outside to allow using liquid electro-optical material such as liquid crystal.

Still furthermore, a method for contactless test of flat panel display using an electro-optical modulator assembly according to the present disclosure is such that even a large-sized flat panel display can be effectively tested by a modulator having a relatively small light transmission area.

Still furthermore, a method for contactless test of flat panel display using an electro-optical modulator assembly according to the present disclosure is such that flat panel displays can be efficiently manufactured by performing a contactless test of partially processed products in the manufacturing process of the flat panel displays.

What is claimed is:

1. An electro-optic modulator assembly for contactless testing of a flat panel display comprising:
   an upper glass plate;
   a conductive layer coated on an entire surface of the upper glass plate;
   a lower glass plate arranged between the flat panel display and the surface of the conductive layer that is coated with the conductive layer;
   a sealing material that is positioned between the upper glass plate and the lower glass plate and defining a void therebetween, an external wall surface of the sealing material being aligned along an axis that extends along a lateral surface of the upper glass plate;

a modulation layer including of electro-optic material and positioned in the void defined by the upper glass plate, the lower glass plate and the sealing material; and a conductive material continuously coated along the lateral surface of the upper glass plate, a lateral surface of the conductive layer and a lateral surface of the sealing material.

2. The assembly as claimed in claim 1, wherein the sealing material includes conductive material.

3. The assembly as claimed in claim 1, wherein the lower glass plate further comprises a sub-conductive layer coated along an upper peripheral surface thereof, and the conductive material is continuously coated along the lateral surface of the sealing material and contacting a surface of the sub-conductive layer of the lower glass plate.

4. The assembly as claimed in claim 3, wherein the sealing material includes conductive material and the sub-conductive layer of the lower glass plate is brought into contact with the sealing material.

5. The assembly as claimed in claim 1, further comprising a spacer for maintaining a space between the upper glass plate and the lower glass plate.

6. The assembly as claimed in claim 1, wherein the modulation layer of the modulator includes liquid crystal material.

7. The assembly as claimed in claim 1, wherein the lower glass plate has an area larger than that of the upper glass plate.

8. A method employed in testing a flat panel display that is configured to use a method of contactless testing of a flat panel display, the method comprising:

forming a conductive layer coated on a surface of a glass plate;

forming a sealing material that contacts with the glass plate, the sealing material defining a void for forming a modulator;

forming an electrode on the glass plate for manufacturing a flat panel display;

horizontally placing the glass plate on a test rack;

applying an operating voltage to the electrode formed on the glass plate;

facing a conductive layer-less side of a modulator toward the electrode of the glass plate and arranging the electrode upward of the glass plate, where the modulator is formed at one side thereof with a conductive layer and where the modulator includes electro-optic material;

applying a reference voltage to the conductive layer of the modulator;

irradiating light from under the glass plate;

measuring a modulated optical characteristic of light that has passed through the glass plate and the modulator; and processing a back-end if the measured optical characteristic is within a prescribed normal scope.

9. The method as claimed in claim 8, further comprising determining whether to test other regions on the glass plate after measuring the modulated optical characteristic of light that has passed through the glass plate and the modulator.

10. The method as claimed in claim 9, wherein, if it is determined that testing should be performed on other regions on the glass plate, horizontally moving a light source and a camera relative to the glass plate, and repeating the process of irradiating light and measuring the modulated optical characteristic of light.

11. The method as claimed in claim 8, wherein measuring the modulated optical characteristic of light comprises:

firstly polarizing the light irradiated from under the glass plate before entering the modulator;

secondly polarizing the light that has passed through the modulator;

obtaining, by a camera, a two-dimensional image in response to the secondly polarized light; and image-processing the obtained two-dimensional image to analyze an optical characteristic distribution of the secondly polarized light.

12. The method as claimed in claim 11, further comprising determining whether to test other regions on the glass plate after measuring the modulated optical characteristic of light.

13. The method as claimed in claim 12, wherein, if it is determined that testing should be performed on other regions on the glass plate, horizontally moving a light source and the camera relative to the glass plate, and repeating the process of irradiating light to the glass plate and measuring the modulated optical characteristic of light.

14. An electro-optic modulator assembly for contactless testing of a flat panel display comprising:

a first non-conductive plate;

a conductive layer positioned between the first non-conductive plate and the flat panel display, the conductive layer covering a surface of the first non-conductive plate;

a second non-conductive plate positioned between the conductive layer and the flat panel display;

one or more sealing structures positioned between the first non-conductive plate and the second non-conductive plate, a cavity being defined by walls of the sealing structures and walls of portions of the conductive layer and second non-conductive plate that are separated by the sealing structures;

a modulation layer, including electro-optic material, positioned within the cavity that is defined between by the walls of the sealing structures and the walls of portions of the conductive layer and second non-conductive plate that are separated by the sealing structures; and a conductive material extending between a position beside at least one of the sealing structures and a position beside the first non-conductive plate.

15. The electro-optic modulator assembly of claim 14, wherein the first and second non-conductive plates include glass.

16. The electro-optic modulator assembly of claim 14, wherein the conductive material is positioned at a position immediately adjacent and contacting at least one of the sealing structures.

17. The electro-optic modulator assembly of claim 14, wherein the conductive material is positioned at a position immediately adjacent and contacting the first non-conductive plate.

18. The electro-optic modulator assembly of claim 14, wherein the conductive material is positioned at a position immediately adjacent and contacting the conductive layer.

19. The electro-optic modulator assembly of claim 14, further comprising at least one spacer positioned with the modulation layer within the cavity defined between by the walls of the sealing structures and the walls of portions of the conductive layer and second non-conductive plate that are separated by the sealing structures.

20. The electro-optic modulator assembly of claim 14, wherein the sealing structures are positioned between the conductive layer and the second non-conductive plate.

* * * * *